United States Patent
Abdel-Aziz et al.

(10) Patent No.: US 8,341,740 B2
(45) Date of Patent: Dec. 25, 2012

(54) METHOD AND SYSTEM FOR IDENTIFYING ENTERPRISE NETWORK HOSTS INFECTED WITH SLOW AND/OR DISTRIBUTED SCANNING MALWARE

(75) Inventors: Bassem Abdel-Aziz, Kanata (CA); Stanley Chow, Ottawa (CA); Shu-Lin Chen, Kanata (CA)

(73) Assignee: Alcatel Lucent, Paris (FR)

( * ) Notice: Subject to any disclaimer, the term of this patent is extended or adjusted under 35 U.S.C. 154(b) by 987 days.

(21) Appl. No.: 12/124,431

(22) Filed: May 21, 2008

(65) Prior Publication Data

US 2009/0293122 A1    Nov. 26, 2009

(51) Int. Cl.
*G06F 21/00* (2006.01)

(52) U.S. Cl. .......... 726/23; 709/224; 709/238; 370/235; 370/241; 705/51; 705/52; 705/53; 705/54

(58) Field of Classification Search ...... 726/23
See application file for complete search history.

(56) References Cited

U.S. PATENT DOCUMENTS

| | | | | |
|---|---|---|---|---|
| 7,386,888 | B2* | 6/2008 | Liang et al. | 726/23 |
| 7,584,507 | B1* | 9/2009 | Nucci | 726/23 |
| 7,607,170 | B2* | 10/2009 | Chesla | 726/22 |
| 7,681,235 | B2* | 3/2010 | Chesla et al. | 726/23 |
| 7,712,134 | B1* | 5/2010 | Nucci et al. | 726/23 |
| 7,725,934 | B2* | 5/2010 | Kumar et al. | 726/22 |
| 7,792,779 | B2* | 9/2010 | Dash | 706/52 |
| 7,836,496 | B2* | 11/2010 | Chesla et al. | 726/13 |
| 2004/0093513 | A1* | 5/2004 | Cantrell et al. | 713/201 |
| 2004/0204925 | A1* | 10/2004 | Alon et al. | 703/2 |
| 2005/0033989 | A1* | 2/2005 | Poletto et al. | 713/201 |
| 2006/0282894 | A1* | 12/2006 | Duffield et al. | 726/23 |
| 2006/0291469 | A1 | 12/2006 | Omote et al. | |
| 2006/0294588 | A1* | 12/2006 | Lahann et al. | 726/23 |
| 2007/0011741 | A1* | 1/2007 | Robert et al. | 726/22 |
| 2007/0067845 | A1 | 3/2007 | Wiemer et al. | |
| 2007/0067847 | A1 | 3/2007 | Wiemer et al. | |
| 2007/0067848 | A1 | 3/2007 | Gustave et al. | |
| 2007/0226799 | A1* | 9/2007 | Gopalan et al. | 726/23 |
| 2008/0052774 | A1* | 2/2008 | Chesla et al. | 726/13 |
| 2008/0086772 | A1* | 4/2008 | Chesla | 726/23 |
| 2008/0101234 | A1* | 5/2008 | Nakil et al. | 370/235 |
| 2008/0262991 | A1* | 10/2008 | Kapoor et al. | 706/20 |
| 2009/0276852 | A1* | 11/2009 | Alderson et al. | 726/23 |

OTHER PUBLICATIONS

An Information-Theoretic View of Network-Aware Malware Attacks|http://users.ece.gatech.edu/~jic/infoattack.pdf|Zesheng Chen & Chuanyi Ji|2008.*
International Search Report, Form PCT/ISA/210, Apr. 2007.
Written Opinion of the International Searching Authority, Form PCT/ISA/237, Apr. 2005.

(Continued)

*Primary Examiner* — Taghi Arani
*Assistant Examiner* — Mahfuzur Rahman
(74) *Attorney, Agent, or Firm* — Fay Sharpe LLP (57) ABSTRACT

Malware detection systems are presented in which a list is constructed of enterprise hosts to or from which each given enterprise network host sends or receives packets within a current measurement period and statistics are accumulated based on two or more measurement period lists, with a count value being derived from the statistics to indicate the number of other hosts to or from which each monitored host sent or received packets, and one or more monitored hosts may be identified as suspected of being infected with slow and/or distributed scanning malware for which the count value exceeds a threshold value.

12 Claims, 7 Drawing Sheets

OTHER PUBLICATIONS

Vyas Sekar, Yinglian Xie, Michael K. Reiter, and Hui Zhang, A multi-resolution approach for worm detection and containment, 2000 IEEE.

Ruoming Pang, Mark Allman, Mike Bennett, Jason Lee, Vern Paxson, and Brian Tierney, A First Look at Modern Enterprise Traffic, Internet Measurement Conference 2005.

Jaeyeon Jung, Vern Paxson, Arthur W. Berger, and Hari Balakrishnan, Fast Portscan Detection Using Sequential Hypothesis Testing, MIT Computer Science and Artificial Intelligence Laboratory.

David Whyte Evangelos Kranakis, and P.C. Van Oorschot, DNS-based Detection of Scanning Worms in an Enterprise Network, School of Computer Science, Carleton University, Ottawa, Ontario, Canada.

Stuart E. Schechter, Jaeyeon Jung, and Arthur W. Berger, Fast Detection of Scanning Worm Infections, Harvard DEAS.

Shobha Venkataraman, Dawn Song, Phillip B. Gibbons, Avrim Blum, New Streaming Algorithms for Fast Detection of Superspreaders, Carnegie Mellon University.

David Whyte, P.C. Van Oorschot, and Evangelos Kranakis, ARP-based Detection of Scanning Worms Within an Enterprise Network, School of Science, Carleton University, Ottawa, Canada, Jan. 31, 2005.

Paul C. Van Oorschot, Jean-Marc Robert, and Miguel Vargas Martin, A Monitoring System for Detecting Repeated Packets with Applications for Computer Worms, School of Computer Science, Carleton University, Canada.

Nicholas Weaver, Stuart Staniford, and Vern Paxson, Very Fast Containment of Scanning Worms.

* cited by examiner

METHOD AND SYSTEM FOR IDENTIFYING ENTERPRISE NETWORK HOSTS INFECTED WITH SLOW AND/OR DISTRIBUTED SCANNING MALWARE

FIELD OF THE INVENTION

This invention relates generally to the field of networked communications, and more particularly to methods and systems for detecting slow and/or distributed scanning malware infected hosts in an enterprise network.

BACKGROUND OF THE INVENTION

Enterprise networks are found in a variety of businesses, government agencies, academic institutions, and other organizations in which computer resources are shared and interconnected. These networks are susceptible to malware such as worms that use the resources of network processing devices without the knowledge and permission of the owner. Such malware can spread to different network hosts in the enterprise through a process of self-replication in which an infected host computer sends network packets to other enterprise hosts connected to the network, sometimes referred to as scanning packets. Signature-based techniques have been developed along with traffic anomaly methods to help identify malware infected hosts for remedial action. Signature-based methods are generally ineffective since it is very easy for worms to change signatures to avoid detection and remedial action, and do not guard against zero-day attacks. Slow scanning malware, sometimes called stealth worms, operate by sending only a few scanning packets in a given time period and advanced stealth worms adjust the transmission rate of scanning packets based on actual network traffic to avoid detection by traffic anomaly analysis. Advanced stealth worms such as Storm malware use sophisticated scanning techniques and distributed scanning within an enterprise to avoid being detected. This type of slow distributed scanning malware, once replicated on two or more hosts in an enterprise, will divide the enterprise network address space among the infected hosts, and each will target different subsets of the network with scanning packets. In this manner, each infected host may only scan a small number of neighbor hosts, thereby further avoiding detection by existing techniques. Consequently, slow scanning malware and distributed and/or slow scanning malware presents news challenges and conventional malware detection techniques are largely ineffective for identifying enterprise network hosts infected with these malicious programs.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure find particular utility in identifying slow and/or distributed scanning malware in enterprise networks, although the concepts described hereinafter may be used in other settings for detecting or identifying various forms of malicious software within a network. While enterprise networks are often situated behind corporate firewalls, slow scanning malware may be introduced into one or more hosts on the network, such as by a flash USB memory device, an email attachment, or other means. The infected host or hosts can then be employed by the malware to begin self-replication to corrupt other network hosts, and absent countermeasures of the present disclosure, may send scanning packets to try to infect other local hosts in the network. The presently disclosed systems and methods may be advantageously implemented to monitor packet traffic in the enterprise network to identify or detect local infected hosts regardless of any particular signature aspect of the malware scanning packets, even though the malware may employ slow and/or distributed scanning techniques.

In accordance with one or more aspects of the present disclosure, a method is provided for identifying enterprise network hosts suspected of being infected with slow and/or distributed scanning malware. The method includes construction of a current measurement period list of enterprise hosts to or from which each given host sent or received packets within a current measurement period, and accumulation of statistics based on two or more measurement period lists. From these statistics, a count value is derived for one or more monitored hosts, with each count value indicating the number of other hosts to or from which each given monitored host sent or received packets. The method further involves selective identification of one or more monitored hosts as suspected of being infected with slow and/or distributed scanning malware if the count value exceeds a threshold value. In this manner, the method can selectively attribute slow scanning distributed malware infection to enterprise network hosts that communicate with abnormally or unexpectedly high numbers of other hosts.

The current measurement period list may be constructed in a variety of ways, for instance, by creating a fan-out list for each given host indicating other hosts to which the given host sent packets within the current measurement period, or by creating a fan-in list for each given host indicating other hosts from which each given host received packets within the current measurement period in certain embodiments. Either of these two techniques can be used if there is substantially complete coverage of the local network. For partial coverage situations, it is advantageous to count the fan-out list 52a since that will detect infected hosts that are covered. Various implementations of the method, moreover, may advantageously provide for selectively excluding one or more enterprise hosts from the monitored hosts, such as hosts that serve as email servers, web proxies, NTP servers, and the like, as these hosts would normally be expected to send and receive packets to or from large numbers of neighbor hosts within an enterprise network. The method may further include computing the threshold based at least in part on an average of the count values for the monitored hosts. Normally, keeping track of fan-in and fan-out can be computation and storage intensive (in terms of resources on a switch), although the described embodiments advantageously track IP addresses within the subnet, where the address space is typically only a few thousand, each requiring a single bit. This approach also simplifies processing, where the network element may just use the subnet mask to extract the bits of interest.

Other aspects of the disclosure provide a method of identifying enterprise network hosts suspected of being infected with slow and/or distributed scanning malware, which includes constructing a current measurement period list of enterprise hosts to or from which each given host sent or received packets within a current measurement period and accumulating statistics based on two or more measurement period lists. This method further includes deriving a count change value from the accumulated statistics for one or more monitored hosts, each count change value being indicative of a change in the number of other hosts to or from which each given monitored host sent or received packets, and selectively identifying one or more monitored hosts for which the count change value exceeds a change threshold value as suspected of being infected with slow and/or distributed scanning malware.

In accordance with further aspects of the disclosure, a system is provided for identifying enterprise network hosts suspected of being infected with slow and/or distributed scanning malware. The system includes a network element operatively coupled to an enterprise network and operative to construct a current measurement period list of enterprise hosts to or from which each given host sent or received packets within a current measurement period, as well as a malware detection component operative to accumulate statistics based on two or more measurement period lists from the network element. The malware detection component includes an analysis component that derives a count value from the accumulated statistics for one or more monitored hosts, with each count value indicating the number of other hosts to or from which each given monitored host sent or received packets. The analysis component is further operative to selectively identify one or more monitored hosts for which the count value exceeds a threshold value as suspected of being infected with slow and/or distributed scanning malware. In one embodiment, the network element can be an enterprise switch, and the malware detection component can be implemented in an enterprise management station operatively coupled with the network element. The network element in certain embodiments is operative to create the current measurement period list as a fan-out list or a fan-in list, and the analysis component may compute the threshold based at least in part on an average of the count values for the monitored hosts. In various implementations, moreover, the analysis component selectively excludes one or more enterprise hosts from the monitored hosts, such as hosts that serve as email servers, web proxies, NTP servers, or other hosts which would normally be expected to exchange network packets with large numbers of other hosts within the enterprise.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION

Figure 1:
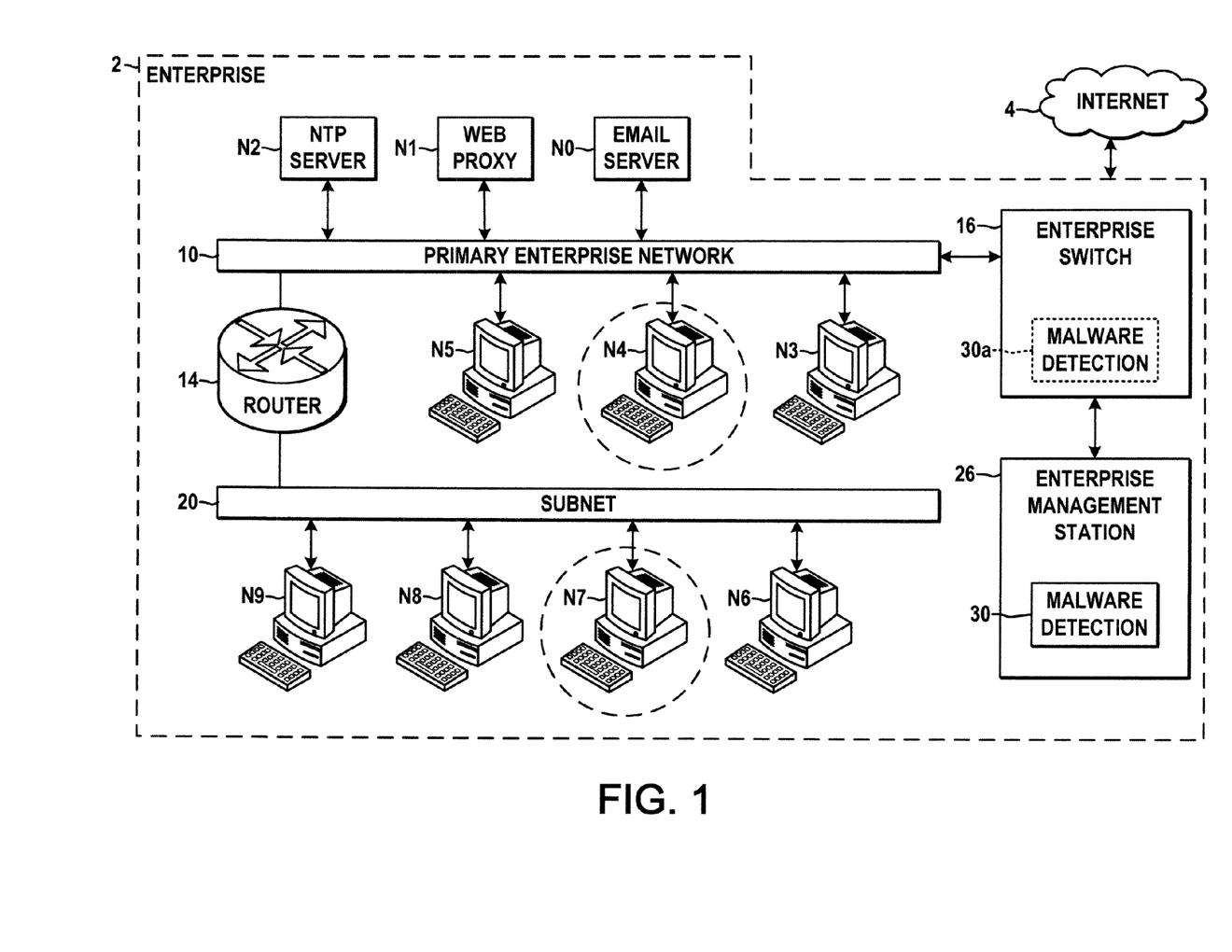
FIG. 1 is a schematic system level diagram illustrating an exemplary enterprise with an enterprise network interconnecting a number of host computing devices and including an enterprise switch and an associated enterprise management station configured with malware detection system components to identify hosts suspected of being infected with slow and/or distributed scanning malware in accordance with one or more aspects of the present disclosure.

Several embodiments or implementations of the various aspects of the present disclosure are hereinafter illustrated and described in conjunction with the drawings, wherein like reference numerals are used to refer to like elements. An exemplary enterprise 2 is shown in FIG. 1, which can be a business, an educational institution, a government institution, or a subdivision or combination thereof, and which includes an enterprise network 10, 20. In the illustrated embodiment, the enterprise network includes a primary network portion 10 and a subnet 20 operatively coupled via a router 14, and including an edge switch 16 with an associated enterprise management station 26. One suitable edge switch is an Alcatel-Lucent OmniSwitch Series edge switch. The network 10, 20 may be operatively coupled with one or more external networks such as the Internet 4 via the switch 16 or other components, and may include any number of primary and subnet portions. The enterprise network 10, 20, moreover, includes any number of operatively interconnected computing devices communicatively coupled with one another via one or more wired and/or wireless connections for exchanging various signals, messages, packets, etc. with one another, wherein only a certain number of devices and interconnections are shown so as not to obscure the various aspects of the present disclosure. These are indicated as network host computing devices or nodes N, wherein ten such nodes N0-N9 are shown in FIG. 1, although the disclosure may be implemented in enterprise networks having any integer number of nodes or hosts. The enterprise example depicted in FIG. 1 includes various nodes that function as enterprise servers including an email server N0, a web proxy N1, and an NTP server N2. In addition, various general purpose hosts N3-N9 are coupled with the network 10, 20, in this case user computers, two of which N4 and N7 are circled in the drawing to indicate an exemplary scenario in which these two hosts are infected with malware that employs slow and/or distributed scanning to attempt to infect other hosts in the enterprise 2. In accordance with the present disclosure, the enterprise switch 16 and/or the management station 26 are provided with malware detection components 30, 30a to identify enterprise network hosts N suspected of being infected with slow and/or distributed scanning malware.

Figure 2:
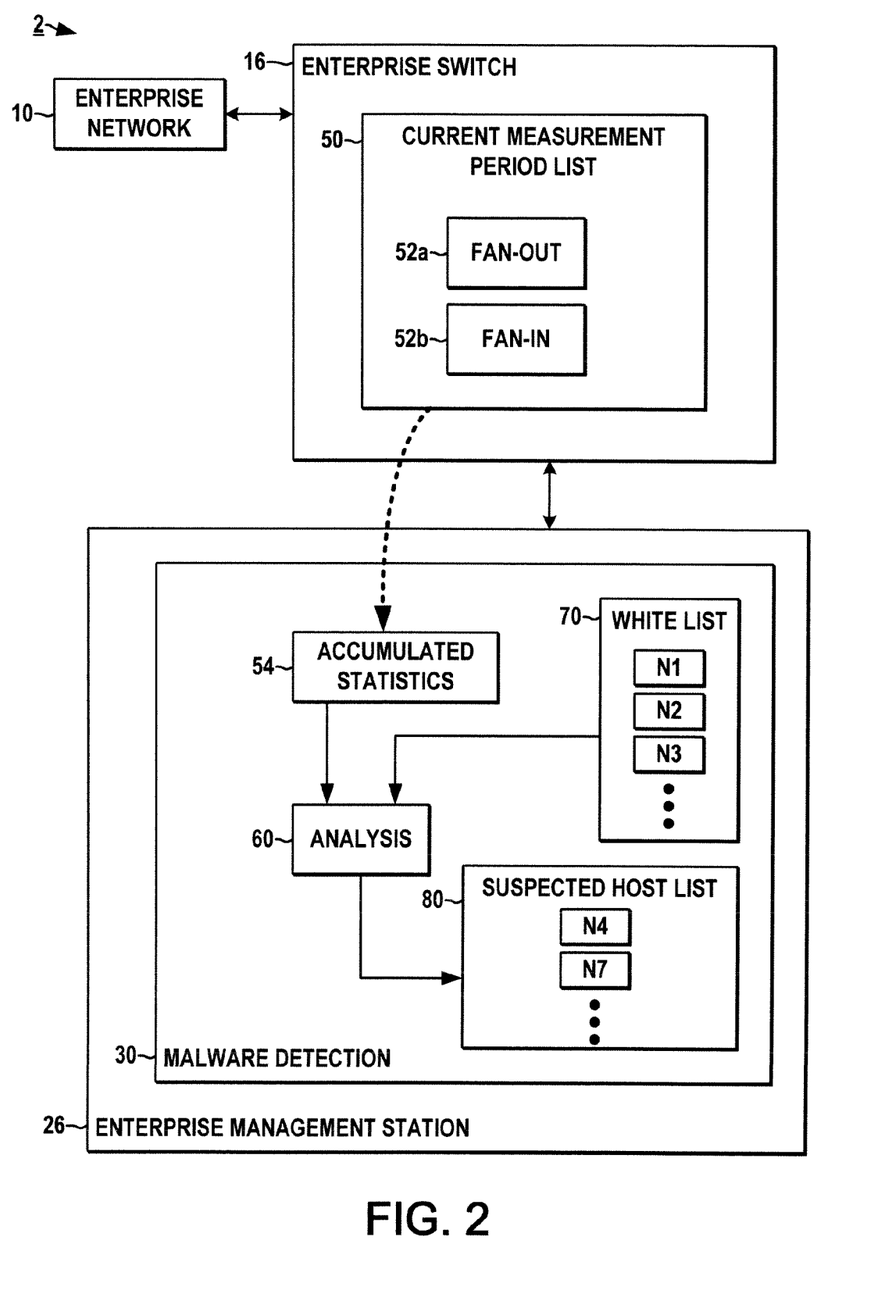
FIG. 2 is a schematic diagram illustrating further details of the exemplary malware detection system components in accordance with the disclosure.

Referring also to FIG. 2, in one possible embodiment, the enterprise switch 16 constructs a current measurement period list 50, which may include a fan-out list 52a and/or a fan-in list 52b, and malware detection component 30 in the enterprise management station 26 provides for analysis of accumulated statistics 54 to create a list 80 of suspected hosts N. In other embodiments, the malware detection component 30a could be included in the enterprise switch 16 (as depicted in FIG. 1), or the malware detection system could be implemented in any network element of the enterprise 2 or in distributed fashion in two or more elements operatively coupled with the enterprise network 10, 20.

The switch 16 and the management station 26 in the example of FIG. 2 include components that constitute an exemplary system for identifying enterprise network hosts N4 and N7 suspected of being infected with slow and/or distributed scanning malware. The malware system components, moreover, may be implemented as any suitable hardware, software, firmware, logic, or other form, whether unitary or implemented in distributed fashion, by which the various functions described herein may be carried out in an enterprise 2 having a network 10, 20. The malware detection/identification system components, moreover, may be implemented in any form, type, and topology of network in an enterprise 2, whether wired, wireless, or combinations thereof, in which various messages, packets, signals, data, etc., are sent and received according to any suitable messaging protocols, wherein the network may be operated according to any suitable multi-layer scheme (e.g., the OSI basic reference model or derivatives or variants thereof) in which messages to, from, or between the various networked components may be segmented or partitioned into packets, and in which one or more layers may add certain control information around a payload portion from another layer to form encapsulated packets or messages. In this regard, packets as used herein is intended to encompass all forms of frames, data packets, etc. sent over the network 10, 20 within a given layer or multiple layers.

The exemplary malware identification system in the embodiment of FIGS. 1 and 2 includes a switch network element 16 on the network 10, which operates to construct a current measurement period list 50 of enterprise hosts N to or from which each given host N sent or received packets within a current measurement period. In one possible implementation, the list 50 is constructed as a fan-out list 52a for each given host N indicating other hosts N to which the given host N sent packets within the current measurement period. Another possible implementation involves creation of a fan-in list 52b for each given host N indicating other hosts N from which each given host N received packets within the current measurement period. In the illustrated embodiment, moreover, the edge switch 16 is ideally suited to creating one or more of these lists 50 in a given measurement period, such as about 10 minutes long in one example, as the switch 16 can track each packet transferred between the hosts N on the network 10, 20. The system also includes a malware detection component 30 that accumulates statistics 54 based on two or more measurement period lists 50 from the switch 16. For example, the switch 16 may update the component 30 of the enterprise management station 26 with the current measurement period list 50 after each measurement interval or period, where the measurement periods may, but need not be uniform and the length thereof may change within the scope of the disclosure.

Figure 3:
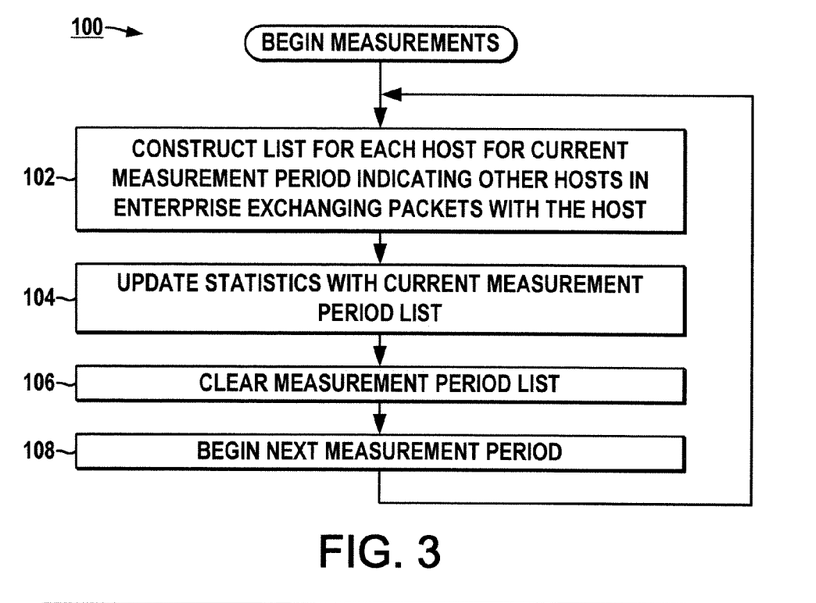
FIG. 3 is a flow diagram illustrating measurement of enterprise network packets and construction of a current measurement period list in accordance with further aspects of the present disclosure.
Figure 4:
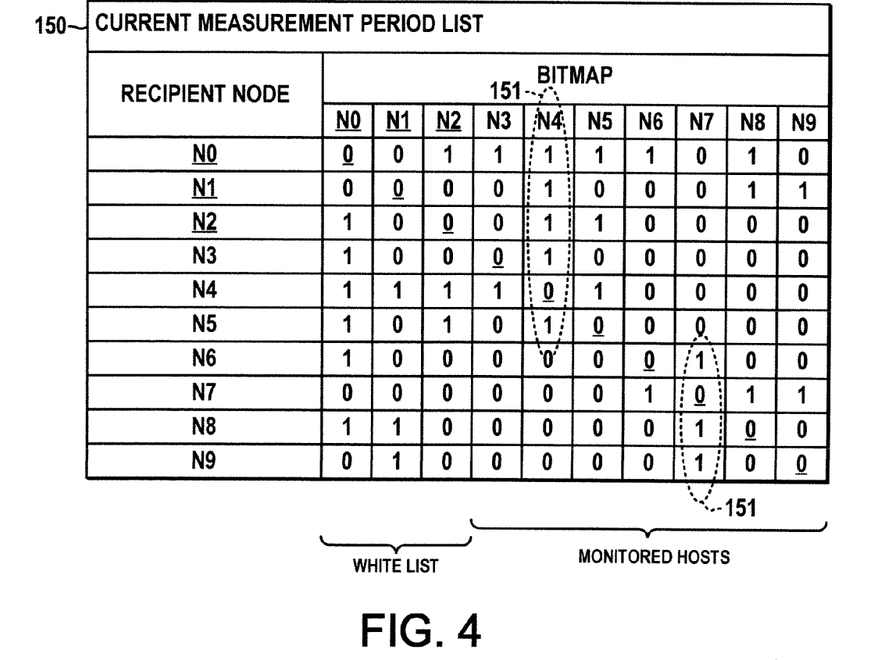
FIG. 4 is a schematic diagram illustrating an exemplary current measurement period list in accordance with the disclosure.

Referring also to FIGS. 3 and 4, FIG. 3 illustrates a flow diagram 100 showing measurement of packets in the enterprise network 10, 20 and construction of a current measurement period list, and FIG. 4 shows an exemplary current measurement period list 150 constructed by the enterprise switch 16 in FIG. 1 in accordance with the disclosure. As noted in FIG. 3, the switch 16 constructs a list at 102 for each host for the current measurement period, and then updates the statistics 54 of the detection component 30 with the current measurement period list 150. The list 150 is then cleared at 106 and the next measurement period begins at 108, and the process may be repeated.

As shown in FIG. 4, the exemplary current measurement period list 150 shows a list (row) for each recipient node N0-N9 in the enterprise 2 indicating a "0" if the recipient node did not receive a packet in the current measurement period from the neighbor host shown at the top of each column, and alternatively indicates a "1" if the recipient host node received one or more packets from the host indicated in the column. In this embodiment, each row of the list 150 provides a fan-in list 52b indicating other hosts N from which the recipient host received packets within the current measurement period. Also, the columns of the exemplary list 150 constitute a fan-out list 52a for each given host N indicating other hosts N to which the given host N sent packets within the current measurement period. FIG. 4 further illustrates the situation in which infected hosts N4 and N7 are performing distributed scanning in the enterprise 2 with the host N4 sending scanning packets to and receiving response packets from nodes N0-N3 and N5 while node N7 sends scanning packets to and receives response packets from nodes N6, N8, and N9, indicated by the circled "1"s 151 in FIG. 4. As shown in FIG. 4, moreover, the hosts N in the enterprise 2 may be portioned into hosts N0-N2 that serve as email servers, web proxies, or NTP servers, which are included in a "white list" 70 in the malware component 30, and the remaining host nodes that are "monitored hosts" N3-N9 in this example.

Figure 5A:
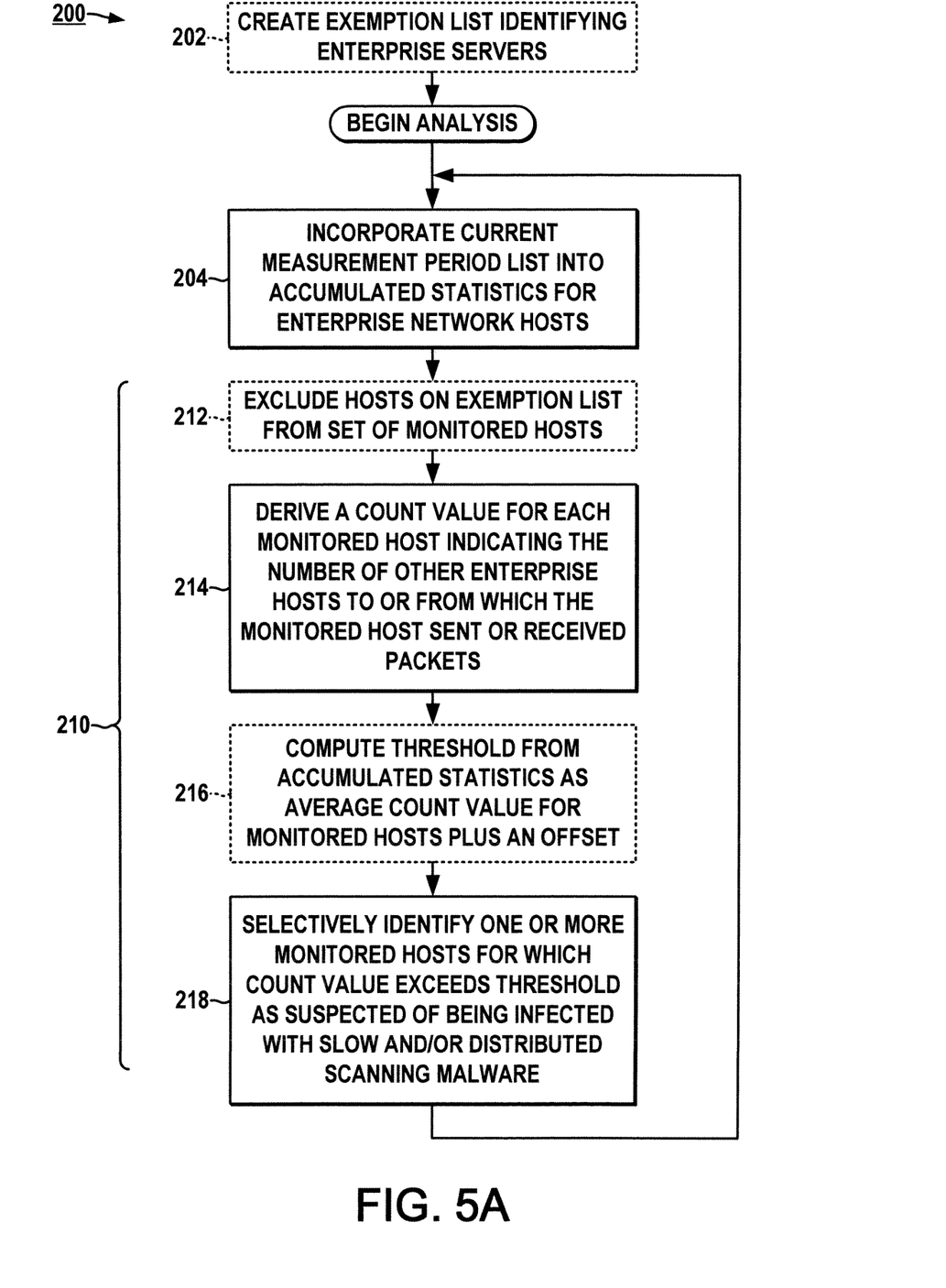
FIG. 5A is a flow diagram illustrating accumulation of statistics and selective identification of suspected enterprise hosts using count values derived from the statistics and a threshold computed based on an average of the count values for monitored hosts in accordance with further aspects of the present disclosure.
Figure 6:
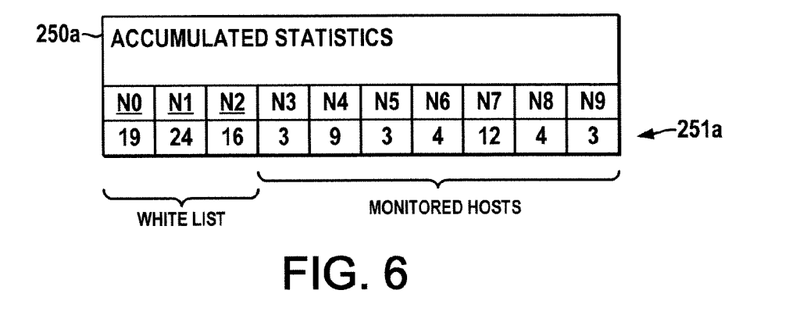
FIG. 6 is a schematic diagram illustrating an exemplary set of accumulated statistics for the enterprise hosts of FIG. 1, including count values accumulated from fan-out measurement period lists for monitored hosts and excluded hosts, in a situation where two network hosts are infected with slow and/or distributed scanning malware.
Figure 7:
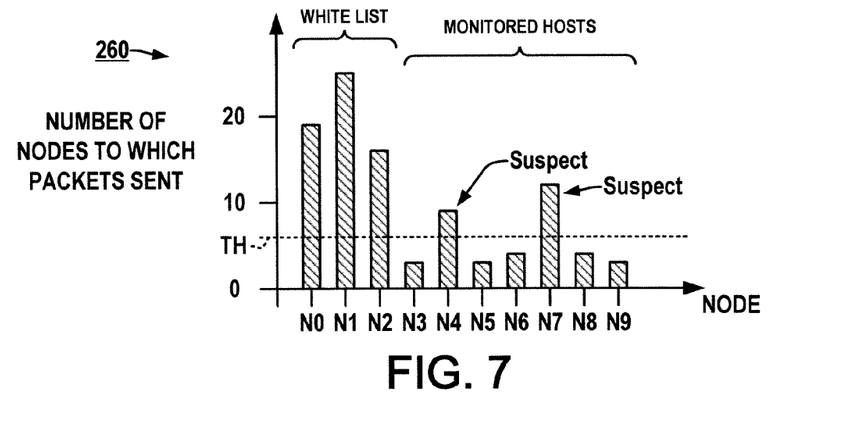
FIG. 7 is a graph showing the count values of FIG. 6 along with a threshold computed based on the average of the count values for the monitored hosts.

Referring now to FIGS. 2, and 5A-7, the exemplary detection component 30 includes an analysis component 60 that accumulates statistics 54 based on the current measurement period list 50 from the switch 16. The accumulation of these statistics 54 may include one or more mathematical operations, such as adding the "1"s from the current measurement period list 150 for a given row and adding this to a cumulative count value for each of a plurality of monitored hosts N. FIGS. 6 and 7 illustrate an example of accumulated statistics 250a based on fan-out data 52a from the switch 16 in which the analysis component 60 derives a count value 251a from the accumulated statistics 54 for one or more monitored hosts N3-N9, with each count value 251a indicating the number of other hosts N to which each given monitored host N3-N9 sent packets over a time period corresponding to two or more of the measurement periods. The accumulated statistics may alternatively be based on several most recent measurement periods, such as by performing a moving totalization of the last integer number K measurement periods, with K being a positive integer greater than 1. Other mathematical operations may be involved in the accumulation of the statistics 54, such as computing rates of change, integrals, averaging, filtering, etc.

Based on the accumulated statistics 54, the analysis component 60 is operative to selectively identify one or more monitored hosts N3-N9 as suspected of being infected with slow and/or distributed scanning malware. The component 60 in this regard, may construct a list 80 (FIG. 2) indicating hosts N that are suspected of being so infected. In one example, the analysis component 60 identifies suspects N4 and N7 as those enterprise hosts for which the count value 251$a$ exceeds a threshold value TH. A graph 260 in FIG. 7 provides an example based on the fan-out count values 251$a$ in FIG. 6, in which the threshold TH is set to the average of the count values of the monitored hosts N3-N9 plus an offset so as to identify host nodes for which unexpectedly high count values are seen, and hence to identify those hosts N4 and N7 that are probably engaged in scanning to replicate slow and/or distributed scanning malware. In this regard, the threshold TH and the analysis can be selectively done only for certain monitored hosts N3-N9 thereby excluding one or more enterprise hosts N1-N3 from the suspect list, for example, by excluding those nodes that are listed in the white list 70 of FIG. 2. In the described example of FIGS. 6 and 7, the hosts N4 and N7 show higher than expected count values 251$a$ (above the threshold TH in FIG. 7), and are thus suspected as being infected with malware and listed in the suspected host list 80 of FIG. 2.

Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components 30, 60, etc. may be implemented as computer implemented steps via programmed software code or other programming or configuration to provide a desired result, where such steps involve manipulation or transformation of physical quantities such as stored memory states in a computer memory. In particular, certain embodiments may include software components operating according to programmed computer-executable instructions stored in an electronic memory, which operate on data and packets sent to or received from the network 10, 20, which data may be likewise stored in an electronic memory at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc.

In this regard, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosure is not limited by these aspects of any given implementation.

The analysis component 60 in this embodiment operates generally in accordance with the flow diagram describing a method 200 illustrated in FIG. 5A. Although the exemplary method 200 and other methods are illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the malware detection aspects illustrated and described herein.

At 202 in FIG. 5A, the component 60 may optionally create an exemption or exclusion list (e.g., white list 70 in FIG. 2 above) identifying enterprise servers (e.g., email server N0, web proxy N1, and/or NTP server N2 in the example of FIG. 1) that are expected to normally communicate with large numbers of host nodes N in the enterprise. At 204, the analysis component 60 incorporates the current measurement period list (e.g., list 150 in FIG. 4) into the statistics (statistics 250$a$ in FIG. 6), and then selectively identifies suspected malware hosts at 210. At 212, the analysis component 60 may optionally exclude the hosts N0-N2 on the white list 70 (FIG. 1) from the set of monitored hosts.

At 214, the component 60 derives a count value 251$a$ from the accumulated statistics 250$a$ for one or more monitored hosts N3-N9 which indicates the number of other hosts to or from which the given monitored host sent or received packets, and optionally computes a threshold TH at 216 based at least in part on an average of the count values 251$a$ for the monitored hosts N3-N9. Thus, in the fan-out example of FIGS. 6 and 7, the threshold TH is determined as the average of the count values 251$a$ of the monitored hosts N3-N9 in FIG. 6 (5.43) plus an offset (about 0.5 in FIG. 7). In other embodiments, the offset can be zero. Further embodiments are possible wherein the threshold is computed via other formulas, preferably so as to reduce the likelihood of false positives while differentiating truly infected hosts from other hosts, where the use of the white list 70 aids in eliminating host whose traffic patterns are known to include large numbers of neighboring hosts. In still other embodiments, a predetermined threshold TH can be used. At 218, the analysis component 60 selectively identifies one or more of the monitored hosts N for which the count value 251$a$ exceeds the threshold value TH as suspected of being infected with slow and/or distributed scanning malware, and adds these to the suspected host list 70 (FIG. 1). In the described example of FIGS. 6 and 7, the hosts N4 and N7 are thus identified as suspects (e.g., the count values 9 and 12 for N4 and N7 each exceed the threshold value TH).

Figure 8:
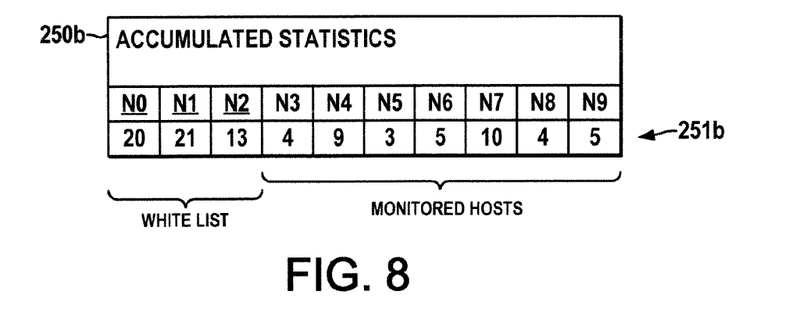
FIG. 8 is a schematic diagram illustrating another exemplary set of accumulated statistics including count values accumulated from fan-in measurement period lists for monitored hosts and excluded hosts.
Figure 9:
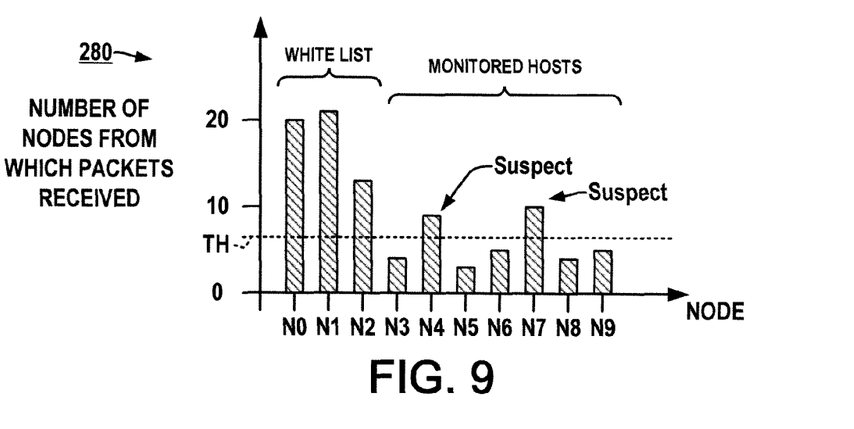
FIG. 9 is a graph showing the count values of FIG. 8 along with a threshold computed based on the monitored host count value average.

Referring now to FIGS. 8 and 9, another example is shown in which the accumulated statistics 250$b$ are compiled based on fan-in data 52$b$, and the analysis component 60 derives a count value 251$b$ (FIG. 8) for each of the monitored hosts N3-N9 indicating the number of other hosts N from which the given monitored host N received packets. As seen in the graph 280 of FIG. 9, the analysis component 60 in this embodiment selectively identifies one or more monitored hosts N4 and N7 at 218 in FIG. 5A for which the count value 251b exceeds the threshold TH as suspected of being infected with slow and/or distributed scanning malware.

Figure 10:
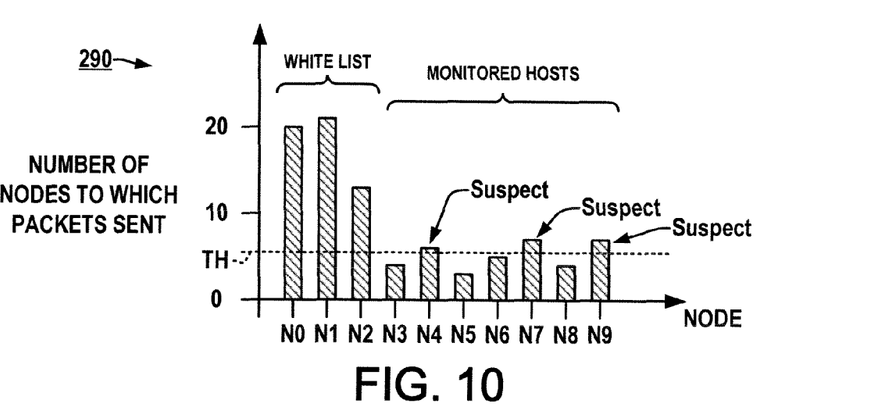
FIG. 10 is a graph showing an updated set of count values accumulated from fan-out measurement period lists for monitored hosts and excluded hosts in a situation where a third host has become infected and has join in distributed scanning.

FIG. 10 illustrates an updated situation (using fan-out data) in which one of the infected hosts N4 or N7 has successfully replicated the malware and infected host N9. As seen in the graph 290 of FIG. 10, the updated statistics indicate that the count value for host N9 now exceeds the threshold value TH, whereby the analysis component 60 identifies hosts N4, N7, and N9 as suspected of being infected with slow and/or distributed scanning malware, as the count values for each of these enterprise hosts exceeds the threshold value TH, even though the malware in these hosts N4, N7, and N9 have effectively split the scanning substantially uniformly amongst themselves.

Figure 5B:
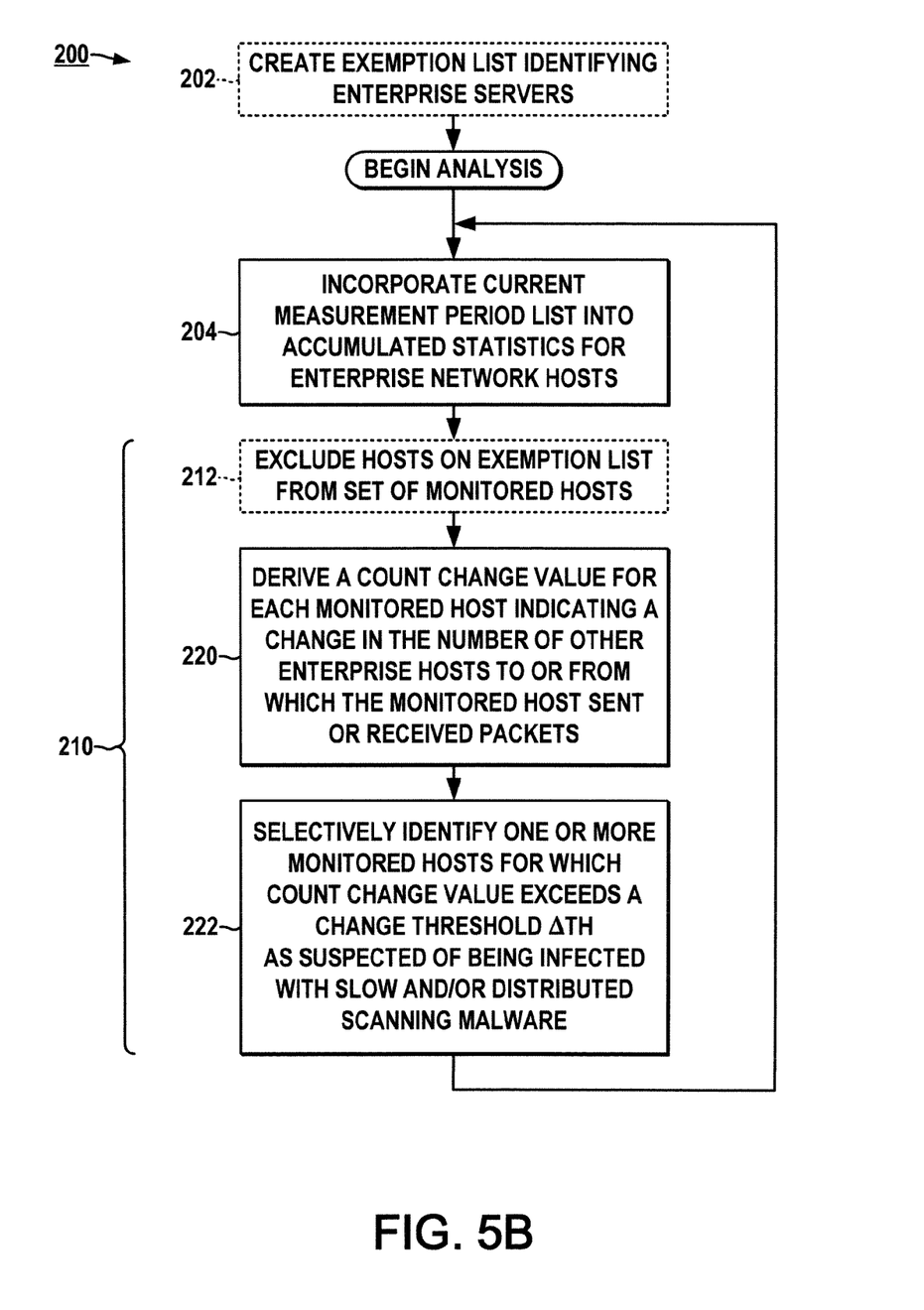
FIG. 5B is a flow diagram illustrating identification of suspected enterprise hosts using count change values for monitored hosts in accordance with other aspects of the disclosure.

FIG. 5B illustrates another possible implementation, in which changes in packet traffic are scrutinized to identify potentially infected hosts in the enterprise 2. The analysis component 60 in this example again optionally creates the exemption or white list at 202 and incorporates the current measurement period list at 204 into the accumulated statistics for the enterprise hosts. One or more of the enterprise servers are then optionally excluded at 212 from the set of monitored hosts. In this implementation, the analysis component 60 derives a count change value at 220, where each count change value indicates a change in the number of other hosts N to or from which each given monitored host N sent or received packets (this embodiment can use either fan-in data or fan-out data as in the above described implementations). At 222, the analysis component 60 then selectively identifies at 222 one or more monitored hosts N for which the count change value exceeds a change threshold value ΔTH as suspected of being infected with slow and/or distributed scanning malware.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A method of identifying enterprise network hosts suspected of being infected with slow and/or distributed scanning malware, the method comprising:
constructing a current measurement period list of enterprise hosts to or from which each given host of an enterprise network sent or received packets within a current measurement period;
accumulating statistics based on two or more measurement period lists;
deriving a count value from the accumulated statistics for monitored hosts of the enterprise network, each count value being indicative of the number of other hosts of the enterprise network to or from which each given monitored host of the enterprise network sent or received packets;
selectively excluding one or more hosts that serve as email servers. web proxies, or NTP servers from the monitored hosts of the enterprise network; and
selectively identifying one or more monitored hosts of the enterprise network for which the count value exceeds a threshold value as suspected of being infected with slow and/or distributed scanning malware.

2. The method of claim 1, wherein constructing the current measurement period list includes creating a fan-out list for each given host of the enterprise network indicating other hosts to which the given host of the enterprise network sent packets within the current measurement period.

3. The method of claim 1, wherein constructing the current measurement period list includes creating a fan-in list for each given host of the enterprise network indicating other hosts from which each given host of the enterprise network received packets within the current measurement period.

4. The method of claim 1, further comprising computing the threshold based at least in part on an average of the count values for the monitored hosts of the enterprise network.

5. A system for identifying enterprise network hosts suspected of being infected with slow and/or distributed scanning malware, comprising:
a network element including an electronic processor operatively coupled to an enterprise network and operative to construct a current measurement period list of enterprise hosts of the enterprise network to or from which each given host of the enterprise network sent or received packets within a current measurement period;
a malware detection component operative to accumulate statistics based on two or more measurement period lists from the network element, the malware detection component comprising:
an analysis component operative to derive a count value from the accumulated statistics for one or more monitored hosts of the enterprise network and to selectively exclude one or more hosts that serve as email servers, web proxies. or NTP servers from the monitored hosts of the enterprise network, each count value being indicative of the number of other hosts of the enterprise network to or from which each given monitored host of the enterprise network sent or received packets, and to selectively identify one or more monitored hosts of the enterprise network for which the count value exceeds a threshold value as suspected of being infected with slow and/or distributed scanning malware.

6. The system of claim 5, wherein the network element is an enterprise switch.

7. The system of claim 6, wherein the malware detection component is implemented in an enterprise management station operatively coupled with the enterprise switch.

8. The system of claim 5, wherein the malware detection component is implemented in an enterprise management station operatively coupled with the network element.

9. The system of claim 5, wherein the network element is operative to create the current measurement period list as a fan-out list for each given host of the enterprise network indicating other hosts of the enterprise network to which the given host of the enterprise network sent packets within the current measurement period.

10. The system of claim 5, wherein the network element is operative to create the current measurement period list as a fan-in list for each given host of the enterprise network indicating other hosts of the enterprise network from which each given host of the enterprise network received packets within the current measurement period.

11. The system of claim 5, wherein the analysis component is operative to compute the threshold based at least in part on an average of the count values for the monitored hosts of the enterprise network.

12. A method of identifying enterprise network hosts suspected of being infected with slow and/or distributed scanning malware, the method comprising:

constructing a current measurement period list of enterprise hosts of an enterprise network to or from which each given host of the enterprise network sent or received packets within a current measurement period;

accumulating statistics based on two or more measurement period lists;

deriving a count change value from the accumulated statistics for one or more monitored hosts of the enterprise network, each count change value being indicative of a change in the number of other hosts of the enterprise network to or form which each given monitored host of the enterprise network sent or received packets;

selectively excluding one or more hosts that serve as email servers, web proxies, or NTP servers from the monitored host of the enterprise network; and selectively indentifying one or more monitored hosts of the enterprise network for which the count change value exceeds a change threshold value as suspected of being infected with slow and/or distributed scanning malware.

* * * * *